United States Patent
Xu et al.

(10) Patent No.: US 8,006,567 B2
(45) Date of Patent: Aug. 30, 2011

(54) STRESS HISTORY RECORDING SYSTEM

(75) Inventors: Chao-Nan Xu, Tosu (JP); Nao Terasaki, Tosu (JP); Yusuke Imai, Tosu (JP); Hiroshi Yamada, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 301 days.

(21) Appl. No.: 12/224,853

(22) PCT Filed: Mar. 6, 2007

(86) PCT No.: PCT/JP2007/054310
§ 371 (c)(1),
(2), (4) Date: Sep. 8, 2008

(87) PCT Pub. No.: WO2007/105539
PCT Pub. Date: Sep. 20, 2007

(65) Prior Publication Data
US 2009/0114033 A1    May 7, 2009

(30) Foreign Application Priority Data

Mar. 10, 2006   (JP) ................................. 2006-066585

(51) Int. Cl.
   *G01L 1/24*   (2006.01)
(52) U.S. Cl. ......................................................... 73/800
(58) Field of Classification Search ................... 73/800; 356/32
   See application file for complete search history.

(56) References Cited

U.S. PATENT DOCUMENTS

| | | | | |
|---|---|---|---|---|
| 3,571,601 | A * | 3/1971 | Kohashi | 250/210 |
| 3,626,240 | A * | 12/1971 | MacIntyre | 315/149 |
| 6,280,655 | B1 | 8/2001 | Xu et al. | |
| 6,628,375 | B2 | 9/2003 | Xu et al. | |
| 7,060,371 | B2 | 6/2006 | Akiyama et al. | |
| 7,297,295 | B2 | 11/2007 | Xu et al. | |
| 7,408,297 | B2 * | 8/2008 | Xu et al. | 313/508 |
| 2001/0017059 | A1 | 8/2001 | Xu et al. | |
| 2003/0124383 | A1 | 7/2003 | Akiyama et al. | |
| 2005/0224760 | A1 | 10/2005 | Xu et al. | |
| 2006/0035079 | A1 * | 2/2006 | Xu et al. | 428/402 |

FOREIGN PATENT DOCUMENTS

| | | |
|---|---|---|
| JP | 2000-119647 | 4/2000 |
| JP | 2000-313878 | 11/2000 |
| JP | 2003-287466 | 10/2003 |
| JP | 2003-292949 | 10/2003 |
| JP | 2004-077396 | 3/2004 |
| JP | 2005-213421 | 8/2005 |
| JP | 2006-022455 | 1/2006 |
| JP | 2006-284393 | 10/2006 |

OTHER PUBLICATIONS

International Search Report for PCT/JP2007/054310 mailed May 15, 2007.

(Continued)

*Primary Examiner* — Lisa Caputo
*Assistant Examiner* — Octavia Davis
(74) *Attorney, Agent, or Firm* — Nixon & Vanderhye PC

(57) ABSTRACT

A stress history recording system for recording a stress history, which includes a light emitting section including a stress-stimulated luminescent material that emits light in response to a mechanical external force, and a recording section for recording a history of a photoreaction generated due to light emission from the light emitting section. This achieves a technology for recording a stress history by using the stress-stimulated luminescent material.

17 Claims, 7 Drawing Sheets

OTHER PUBLICATIONS

Japanese Office Action and English translation, mailed on Apr. 19, 2011, for Japanese Application No. 2008-505068, National Phase in Japan of the PCT International Patent Application No. PCT/JP2007/054310. Translations are provided by Industrial Property Digital Library (IPDL) of Japan Patent Office (JPO).

* cited by examiner

STRESS HISTORY RECORDING SYSTEM

This application is the U.S. national phase of International Application No. PCT/JP2007/054310 filed 6 Mar. 2007 which designated the U.S. and claims priority to Japanese Patent Application No. 2006-66585 filed 10 Mar. 2006, the entire contents of each of which are hereby incorporated by reference.

TECHNICAL FIELD

The present invention relates to a stress history recording system for recording a stress history.

BACKGROUND ART

Such a phenomenon that a certain substance emits visible light in response to various stimuli from the outside (external stimuli) has been known as so-called fluorescent phenomenon. A substance (fluorescent substance) exhibiting the fluorescent phenomenon is utilized in various fields such as a lamp, an illuminating lamp, a cathode-ray tube, various types of display device such as a plasma display panel, and a pigment. Further, a large number of substances (luminescent materials) emitting light in response to external stimuli such as ultraviolet light, electronic beam, X-ray, nuclear radiation, an electric field, or a chemical reaction have been known.

Meanwhile, the inventors of the present invention have found a stress-stimulated luminescent material that emits light due to strain caused by applying a mechanical external force, and have developed methods for evaluation thereof and utilization thereof.

Specifically, as the stress-stimulated luminescent material, the inventors of the present invention have developed a stress-stimulated luminescent body having a spinel structure, a corundum structure or a β-almina structure (see Patent Document 1), a silicate stress-stimulated luminescent body (see Patent Documents 2 and 3), and a high luminescence intensity stress-stimulated luminescent body made of defect-controlled aluminate (see Patent Document 4). The inventors of the present invention have also developed a method in which a stress distribution is visualized and evaluated by applying a mechanical force such as compression, tension, friction, and twisting, to a composite material including an epoxy resin and to a sample piece coated with a film made of the composite material (see Patent Documents 4 and 5). Also, the inventors of the present invention have developed a high luminescence intensity mechanoluminescense material having a structure in which a wurtzite structure and a zinc blende structure exist together and being mainly composed of oxide, sulfide, selenide, and telluride (see Patent Document 6).

Such a stress-stimulated luminescent body can repetitively emit light semi-permanently with such luminescence intensity that the emission can be confirmed by eyes. By using these stress-stimulated light emitting bodies, it becomes possible to measure a stress distribution in a structure including the stress-stimulated luminescent body. Patent Documents 7 and 8, for example, disclose such a method for measurement of the stress distribution.

[Patent Document 1]
Japanese Unexamined Patent Application No. 2000-119647 (published date: Apr. 25, 2000)
[Patent Document 2]
Japanese Unexamined Patent Application No. 2000-313878 (published date: Nov. 14, 2000)
[Patent Document 3]
Japanese Unexamined Patent Application No. 2003-165973 (published date: Jun. 10, 2003)
[Patent Document 4]
Japanese Unexamined Patent Application No. 2001-49251 (published date: Feb. 20, 2001)
[Patent Document 5]
Japanese Unexamined Patent Application No. 2003-292949 (published date: Oct. 15, 2003)
[Patent Document 6]
Japanese Unexamined Patent Application No. 2004-43656 (published date: Feb. 12, 2004)
[Patent Document 7]
Japanese Unexamined Patent Application No. 2001-215157 (published date: Aug. 10, 2001)
[Patent Document 8]
Japanese Unexamined Patent Application No. 2004-77396 (published date: Mar. 11, 2004)

DISCLOSURE OF INVENTION

However, in order to broaden a usage and/or application of a stress-stimulated luminescent body, it is required to develop a method for enhancing emission intensity of the stress-stimulated luminescent body and a method for recording successfully the light emission from the stress-stimulated luminescent body, along with developing a stress-stimulated luminescent body which can keep emitting intense light for a certain period of time.

The present invention is accomplished in view of the problems above, and an object of the present invention is to provide a technique for recording a stress history.

That is, the stress history recording system in accordance with the present invention is a stress history recording system for recording a stress history, the stress history recording system comprising: light emitting means including a stress-stimulated luminescent material that emits light in response to a mechanical external force; and recording means for recording a history of a photoreaction generated due to light emission from the light emitting means, the recording means having a photoreacting section for generating the photoreaction in proportion to intensity of the light emission.

Stress-stimulated light emission is such a phenomenon that light is emitted in proportion to changes in intensity of stress (strain energy, in particular) as a result of detection of only a dynamic force. However, a stress-stimulated luminescent material that generates the stress-stimulated light emission often lacks in a sufficient intensity of light emission, and often has a difficulty in maintaining the light emission for a certain period of time. By using the structure above, the stress history recording system in accordance with the present invention can record, as a stress history, a summation of stress generated within a certain period of time even when a known stress-stimulated luminescent material is used in the structure.

It is preferable to arrange the stress history recording system so as to further include a catalyzing section for enhancing the photoreaction.

With the arrangement, the stress history recording system can record successfully even a small stress history, and detect the recorded stress history even when the summation of stress to be detected is small.

It is preferable to arrange the stress history recording system so that the photoreaction changes in proportion to the external force.

It is preferable to arrange the stress history recording system so that the photoreacting section is irreversible photosensitive.

By using the photoreacting section that is irreversible photosensitive irreversibly, it is possible to record easily a summation of applied stress, a strain, and a summation of energy as a result of the photoreacting section functioning as a recording means.

It is preferable to arrange the stress history recording system so that the photoreacting section is made from a pigment, an inorganic photochromic material, an organic photochromic material, or a photographic photosensitive film.

It is preferable to arrange the stress history recording system so that the pigment is selected from Ag ion-Ag nanoparticles, a ruthenium pigment (N3 pigment, N719, black-dye, and the like), a cyanine pigment (merocyanine, carbocyanine, anthocyanine, hemicyanine, cyanine, and the like), a natural pigment (chlorophyll, protoporphyrin, carotenoid, and the like), a xanthene pigment (eosine Y, rose bengal, and the like), rhodamine 6G, rhodamine B, perylene, triphenylmethane, and a group composed of phthalocyanine and the like.

The stress history recording medium in accordance with the present invention is a stress history recording medium for recording a stress history, the stress history recording medium comprising: a light emitting section including a stress-stimulated luminescent material that emits light in response to a mechanical external force; a recording section for recording a history of a photoreaction generated due to light emission from the light emitting means; and an immobilizing section for immobilizing the light emitting section and the recording section, the recording section having a photoreacting section for generating the photoreaction in proportion to intensity of the light emission, and the recording section covering the light emitting section immobilized on the immobilizing section.

With the structure above, the stress history recording medium can record a summation of stress generated within a certain period of time as a stress history even when a known stress-stimulated luminescent material is used in the structure.

The stress history recording medium in accordance with the present invention is a stress history recording medium for recording a stress history, the stress history recording medium comprising: a light emitting section including a stress-stimulated luminescent material that emits light in response to a mechanical external force; a recording section for recording a history of a photoreaction generated due to light emission from the light emitting section; a catalyzing section for enhancing the photoreaction; and an immobilizing section for immobilizing the light emitting section and the recording section, the catalyzing section being provided adjacently to the light emitting section, the recording section having a photoreacting section for generating the photoreaction in proportion to intensity of the light emission, and the recording section covering at least the catalyzing section.

With the structure above, the stress history recording medium can record successfully even a small stress history, and detect the recorded stress history even when a summation of stress to be detected is small, in addition to being able to record a summation of stress generated within a certain period of time as a stress history even when a known stress-stimulated luminescent material is used in the structure.

The stress history recording medium in accordance with the present invention is a stress history recording medium for recoding a stress history, the stress history recording medium comprising: a light emitting section including a stress-stimulated luminescent material that emits light in response to a mechanical external force; a recording section for recording a history of a photoreaction generated due to light emission from the light emitting section; and an immobilizing section being made from an optically-transparent material and immobilizing the light emitting section and the recording section, the recording section having a photoreacting section for generating the photoreaction in proportion to intensity of the light emission, and the recording section being immobilized on that surface of the light emitting section via the immobilizing section, which faces the recording section.

With the structure above, the stress history recording system can record a summation of stress generated within a certain period of time as a stress history.

The stress history recording medium in accordance with the present invention is a stress history recording medium for recoding a stress history, the stress history recording medium comprising: a light emitting section including a stress-stimulated luminescent material that emits light in response to a mechanical external force; a recording section for recording a history of a photoreaction generated due to light emission from the light emitting section; a catalyzing section for enhancing the photoreaction; and an immobilizing section being made from an optically-transparent material and immobilizing the light emitting section and the recording section, the catalyzing section being provided adjacently to the light emitting section, the recording section having a photoreacting section for generating the photoreaction in proportion to intensity of the light emission, and the recording section being immobilized on that surface of the catalyzing section via the immobilizing section, which faces the recording section.

The stress history recording medium in accordance with the present invention is a stress history recording medium for recoding a stress history, the stress history recording medium comprising: a light emitting section including a stress-stimulated luminescent material that emits light in response to a mechanical external force; a recording section for recording a history of a photoreaction generated due to light emission from the light emitting section; a catalyzing section for enhancing the photoreaction; and an immobilizing section being made from an optically-transparent material and immobilizing the light emitting section and the recording section, the catalyzing section being immobilized on that surface of the light emitting section via the immobilizing section, which faces the catalyzing section, the recording section having a photoreacting section for generating the photoreaction in proportion to intensity of the light emission, and the recording section covering the catalyzing section.

With the structure above, the stress history recording medium can record successfully even a small stress history, and detect recorded stress history even when a summation of stress to be detected is small, in addition to being able to record a summation of stress generated within a certain period of time as stress history even when a known stress-stimulated luminescent material is used in the structure.

The stress history recording medium in accordance with the present invention is a stress history recording medium for recoding a stress history, the stress history recording medium comprising: a light emitting section including a stress-stimulated luminescent material that emits light in response to a mechanical external force; a recording section for recording a history of a photoreaction generated due to light emission from the light emitting section; and a catalyzing section being immobilized on a surface of the light emitting section and enhancing the photoreaction; the recording section having a photoreacting section for generating the photoreaction in proportion to intensity of the light emission, and the recording section covering a plurality of the light emitting sections immobilizing the catalyzing section.

Since a plurality of the light emitting sections that immobilize the catalyzing section are provided, it is not required to provide another immobilizing means (immobilizing section). Further, the recording section may cover wholly a surface of a structure composed of multiple light emitting sections (including catalyzing sections) as shown in FIG. 4(a), or may cover surfaces of individual light emitting section (including catalyzing sections).

It is preferable to arrange the stress history recording medium so that the photoreaction changes in proportion to the external force.

It is preferable to arrange the stress history recording medium so that the photoreacting section is irreversible photosensitive.

By using the photoreacting section that is irreversible photosensitive, it is possible to record easily a summation of applied stress, a strain, and a summation of energy as a result of the photoreacting section functioning as a recording means.

It is preferable to arrange the stress history recording medium so that the photoreacting section is made from a pigment, an inorganic photochromic material, an organic photochromic material, or a photographic photosensitive film.

It is preferable to arrange the stress history recording medium so that the pigment is selected from Ag ion-Ag nanoparticles, a ruthenium pigment (N3 pigment, N719, black-dye, and the like), a cyanine pigment (merocyanine, carbocyanine, anthocyanine, hemicyanine, cyanine, and the like), a natural pigment (chlorophyll, protoporphyrin, carotenoid, and the like), a xanthene pigment (eosine Y, rose bengal, and the like), rhodamine 6G, rhodamine B, perylene, triphenylmethane, and a group composed of phthalocyanine and the like.

For a fuller understanding of other objects, characteristics, and advantages of the present invention, reference should be made to the ensuing detailed description. The advantages of the present invention could be specified with the description taken in conjunction with the accompanying drawings.

DESCRIPTION OF REFERENCE NUMERALS

Figure 1:
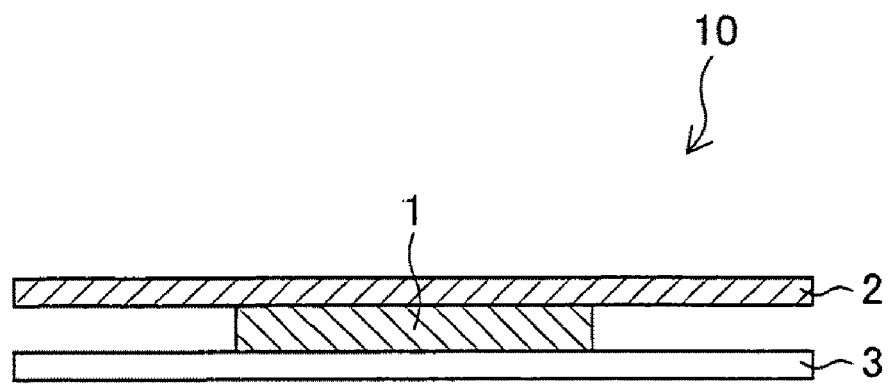
FIG. 1 shows an embodiment of the present invention, and is a cross-sectional view showing a structure of a main part of a stress history recording system.

1: LIGHT EMITTING MEANS (LIGHT EMITTING SECTION, STRESS-STIMULATED LUMINESCENT BODY)
2: RECORDING MEANS (RECORDING SECTION, PHOTOREACTING SECTION, PIGMENT)
3: IMMOBILIZING MEANS (IMMOBILIZING SECTION)
4: CATALYZING SECTION
10: STRESS HISTORY RECORDING SYSTEM (STRESS HISTORY RECORDING MEDIUM)

BEST MODE FOR CARRYING OUT THE INVENTION

A stress-stimulated luminescent body emits light when a mechanical external force (frictional force, shearing force, impulsive force, and pressure, for example) is applied. The inventors of the present invention have found that emission intensity of the stress-stimulated luminescent body is dependant on characteristics of the mechanical external force, and is higher when the applied mechanical acting force is greater. Also, the inventors of the present invention have found that light emission from the stress-stimulated luminescent body tends to be greater when a changing velocity of the mechanical acting force is higher. That is to say, by measuring the emission intensity of the luminescent body, it is possible to find out the characteristics of the mechanical external force being applied to the luminescent body.

The stress-stimulated luminescent body is a functional material that is useful and capable of converting directly a mechanical energy such as displacement, friction, and impulse into light, and has been developed in first by the inventors of the present invention. The inventors of the present invention have been further studying such a material so that the following effects have been attained: 1. a high-efficient force-light conversion due to a crystallographic optimization of a base material and an emission center; 2. a microparticulated material (50 nm to several tens of micrometers); 3. an establishment of a technique for applying the material.

In order to achieve the practical use of a stress-stimulated luminescent body having an insufficient emission intensity and having a difficulty in maintaining light emission for a certain period of time, the inventors of the present invention have also found that, by using a means for recording the light emission from the stress-stimulated luminescent body, it is possible to detect a state of the external force applied to the stress-stimulated luminescent body, and to record a stress history. Based on this, the inventors of the present invention have accomplished the present invention.

[1] First Embodiment

One embodiment of the present invention is described below with reference to FIG. 1. A stress history recording medium 10 in accordance with the present embodiment has a light emitting section 1 including a stress-stimulated luminescent material that emits light in response to a mechanical external force, a recording section 2 for recording a history of a photoreaction generated due to light emission from the light emitting section 1, and an immobilizing section 3 for immobilizing the light emitting section 1 and the recording section 2. The recording section 2 has a photoreacting section that generates the photoreaction due to the light emission from the light emitting section 1. In the present embodiment, the light emitting section 1 is immobilized on the immobilizing section 3, and the recording section 2 is also immobilized on the immobilizing section 3 by covering the light emitting section 1 being immobilized on the immobilizing section 3.

The stress-stimulated luminescent material included in the light emitting section 1 is not particularly limited, and only has to emit light in response to a mechanical energy. In consideration of manageability of quantitative determination, it is preferable to use a stress-stimulated luminescent body that emits light in proportion to a strain energy.

A material constituting the photoreacting section in the recording section 2 is photosensitive to generate photoreaction in response to a wavelength of the light emitted from the light emitting section 1. Substances that are photosensitive due to its photoreactivity can be, for example, a pigment, an inorganic photochromic material, an organic photochromic material, and a photographic photosensitive film, however, are not limited to these. In the present description, the word "photosensitive" means a property of a substance to cause a physical change and/or a chemical change in itself as a result of being affected by light or nuclear radiation (such as X-ray).

Such a pigment that generates the photoreaction in proportion to intensity of the light emission is preferably used as the pigment mentioned above. In order to record easily a summation of applied force, strain, and a summation of energy, it is more preferable to use a pigment that changes colors irreversibly. Preferable pigments are, for example, azobenzen, spiropyran, spirooxazine, diarylethene, fulgide, chromene, Ag nanoparticles (Ag ion), Au nanoparticles (spherical shape, rod shape, nanoprism (triangular system), or the like), retinal (a natural photochromic pigment), and photobleaching pigments (azo group, fluoresceine, and the like), however, are not limited to these.

The immobilizing section 3 may be selected according to a situation in which the stress history recording medium 10 is utilized, however, is preferably composed of a material capable of immobilizing easily the light emitting section 1 and the recording section 2.

It is extremely important to record the stress history from the viewpoint of safety when in regard to safety management of a large size construction, for example. When the mechanical external force is applied, the light emitting section 1 emits light in response to the external force, and then the photoreacting section generates the photoreaction (changes or loses its color). The result obtained by the photoreacting section reacting to the light is recorded as a stress history. That is, the stress history recording medium 10 can record information of an applied mechanical energy by using a stress-stimulated luminescent body that emits light in response to a mechanical energy, in combination with a substance that generates the photoreaction. Further, the present invention enables to detect easily a record of stress history as a change in absorbing spectrum in a recording means. Note that it is easily understood by persons skilled in the art that the absorbing spectrum is not limited in a visible region and a known detector can be used as appropriate according to an absorbing spectrum to be detected.

[2] Second Embodiment

Figure 2A:
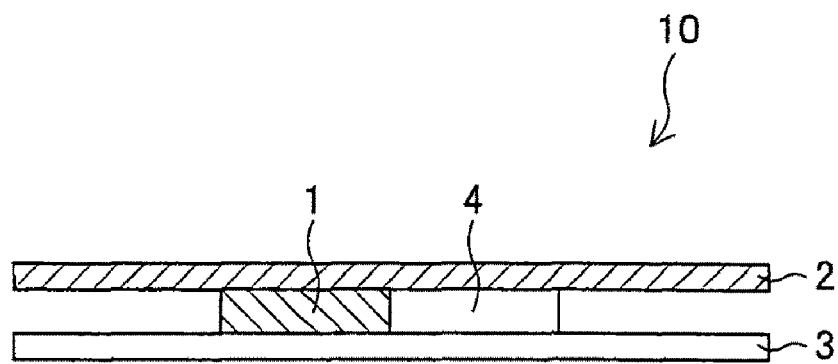
FIG. 2(a) shows an embodiment of the present invention, and is a cross-sectional view showing a structure of a main part of a stress history recording system.
Figure 2B:
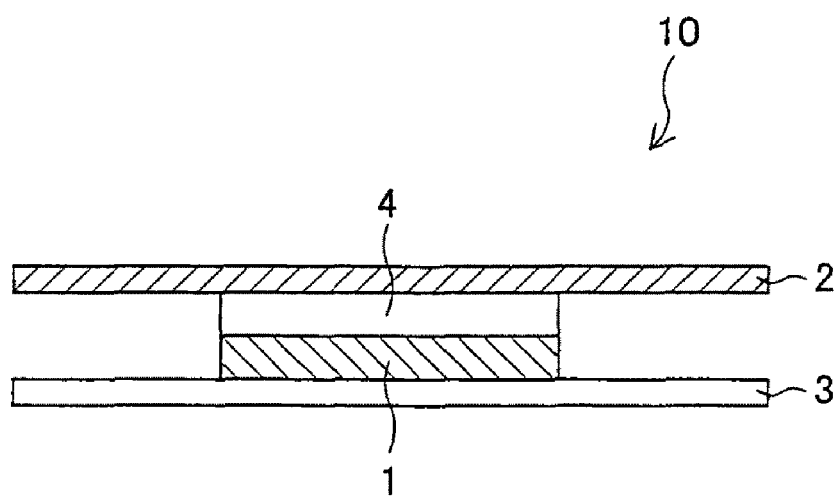
FIG. 2(b) shows an embodiment of the present invention, and is a cross-sectional view showing a structure of a main part of a stress history recording system.

Another embodiment is described below with reference to FIGS. 2(a) and 2(b). A stress history recording medium 10 in accordance with the present embodiment has, in the same way as First Embodiment, a light emitting section 1 including a stress-stimulated luminescent material that emits light in response to a mechanical external force, a recording section 2 for recording a history of a photoreaction generated due to light emission from the light emitting section 1, and an immobilizing section 3 for immobilizing the light emitting section 1 and the recording section 2. The recording section 2 has a photoreacting section that generates the photoreaction due to the light emission from the light emitting section 1. The stress history recording medium 10 in accordance with the present embodiment further includes a catalyzing section 4 for enhancing the photoreaction, which is provided adjacently to the light emitting section 1. The recording section 2 is also immobilized on the immobilizing section 3 by covering at least the catalyzing section 4.

As is the case with First Embodiment, the stress-stimulated luminescent material included in the light emitting section 1 is not particularly limited, and only has to emit light in response to a mechanical energy. In consideration of manageability of quantitative determination, it is preferable to use a stress-stimulated luminescent body that emits light in proportion to a strain energy.

As is the case with First Embodiment, the immobilizing section 3 may be selected according to a situation in which the stress history recording medium 10 is utilized, however, is preferably made from a material capable of immobilizing easily the light emitting section 1 and the recording section 2.

The catalyzing section 4 is not particularly limited, provided that it is composed of a substance capable of enhancing the photoreaction generated in the photoreacting section based on a photo energy generated in the light emitting section 1, and that it is composed of a substance known as "photocatalyst". Substances constituting the catalyzing section 4 may be an oxide semiconductor (titanium dioxide, zinc oxide, tungsten oxide, ferric oxide, and tin oxide, for example), cadmium oxide, and the like. It is particular preferable to use titanium dioxide, an oxidative product composed of a complex of titanium dioxide and other transition metal oxide, and a photocatalyst composed of titanium dioxide-related substance in which a transition metal ion is doped.

A material constituting the photoreacting section in the recording section 2 is photosensitive to generate photoreaction in response to a wavelength of the light emitted from the light emitting section 1. Substances that are photosensitive due to its photoreactivity can be, in the same way as First Embodiment, a pigment, an inorganic photochromic material, an organic photochromic material, and a photographic photosensitive film, for example. However, it is preferable to use, as the substances that are photosensitive to generate the photoreaction, substances that reflect well an effect of the catalyzing section 4. Specifically, when the catalyzing section 4 is composed of titanium dioxide, pigments preferably used for the recording section 2 are Ag ion-Ag nanoparticles, a ruthenium pigment (N3 pigment, N719, black-dye, and the like), a cyanine pigment (merocyanine, carbocyanine, anthocyanine, hemicyanine, cyanine, and the like), a natural pigment (chlorophyll, protoporphyrin, carotenoid, and the like), a xanthene pigment (eosine Y, rose bengal, and the like), rhodamine 6G, rhodamine B, perylene, triphenylmethane, phthalocyanine, methylene blue, porphyrin, methyl violet, and thionin.

In the stress history recording medium 10 in accordance with the present embodiment, the catalyzing section 4 composed of a so-called photocatalyst for promoting the photoreaction in the photoreacting section is adopted. By means of this, it is possible to obtain a stress history record more quickly than the stress history recording medium 10 in accordance with First Embodiment.

It is particularly preferable that a material constituting the catalyzing section 4 reacts effectively to light emitted from the stress-stimulated luminescent material. It is more preferable that the material constituting the catalyzing section 4 is stable and does not change colors when not being irradiated with light. For example, a methylene blue pigment does not change colors at all when not being irradiated with light even when being adsorbed to titanium dioxide. However, when being irradiated with light on the titanium dioxide, the pigment would change colors as a result of the pigment generating an oxidation-reduction reaction as a catalytic reaction. An amount of change in color of the methylene blue pigment is proportional to a total amount of the irradiated light. On the other hand, a total amount of light emitted from the stress-stimulated luminescent material is proportional to a mechanical external force (mechanical energy) that is applied. Therefore, by using the stress history recording medium 10 in accordance with the present embodiment, it is possible to estimate the mechanical energy from the amount of change in color. Note that, when the stress history recording medium 10 in accordance with the present embodiment is used, it is possible to obtain reproducible data by preparing preliminarily a standard value.

Note that, when titanium dioxide is used for the catalyzing section 4, it is not preferable to carry out a detection of a stress history record in a white light environment because a photocatalytic reaction of the titanium dioxide would proceed due to white light entered at time of the detection. However, when the detection of a stress history record is carried out in an environment of light having a wavelength of 700 nm, it is not required to take account of the aforementioned effect of titanium dioxide at time of the detection.

[3] Third Embodiment

Figure 3A:
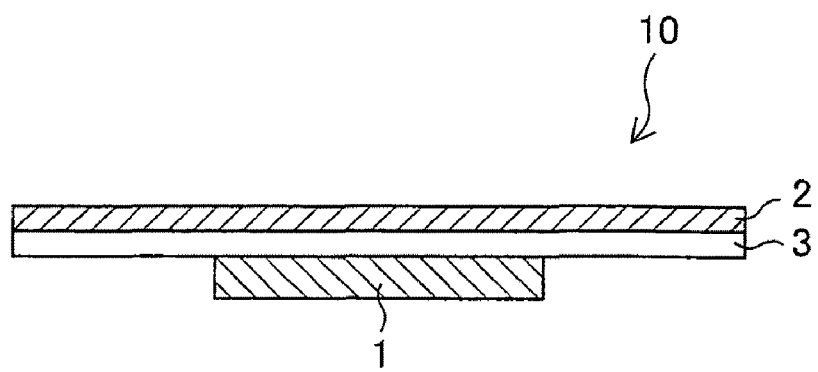
FIG. 3(a) shows an embodiment of the present invention, and is a cross-sectional view showing a structure of a main part of a stress history recording system.

A further embodiment is described below with reference to FIGS. 3(a) and 3(b). A stress history recording medium 10 in accordance with the present embodiment, as shown in FIG. 3(a), has a light emitting section 1 including a stress-stimulated luminescent material that emits light in response to a mechanical external force, a recording section 2 for recording a history of a photoreaction generated due to light emission from the light emitting section 1, and an immobilizing section 3 for immobilizing the light emitting section 1 and the recording section 2. The recording section 2 has a photoreacting section that generates the photoreaction due to the light emission from the light emitting section 1. The light emitting section 1 and the recording section 2 in accordance with the present embodiment are immobilized on those faces of the recording section 2 and the light emitting section 1 respectively, via the immobilizing section 3, which face each other. The immobilizing section 3 is made from an optically transparent material so as to transmit light emitted from the light emitting section 1 to the recording section 2 successfully.

Figure 3B:
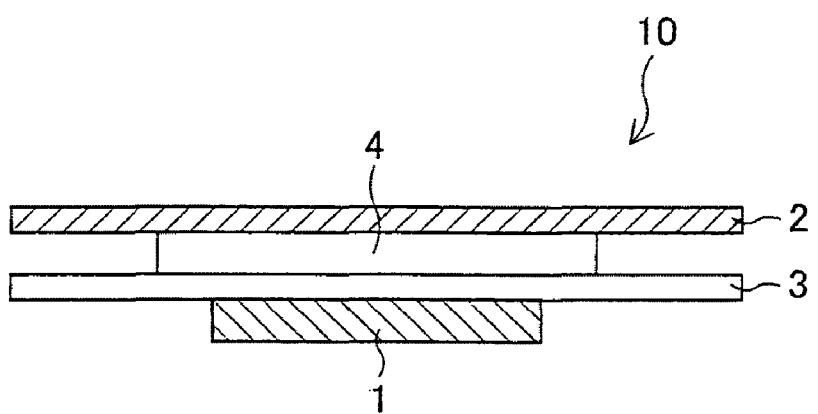
FIG. 3(b) shows an embodiment of the present invention, and is a cross-sectional view showing a structure of a main part of a stress history recording system.

The stress history recording medium 10 in accordance with the present embodiment may have a catalyzing section 4, as shown in FIG. 3(b), in addition to a structure shown in FIG. 3(a). That is, as shown in FIG. 3(b), the light emitting section 1 may be immobilized on the immobilizing section 3; the catalyzing section 4 may be immobilized on that face of the light emitting section 1 via the immobilizing section 3, which faces the catalyzing section; and the recording section 2 may cover the catalyzing section 4.

The immobilizing section 3 may be made entirely from an optically transparent material. However, the immobilizing section 3 may be made partly from the optically transparent material, provided that light emitted from the light emitting section 1 is not prevented from transmitting to the recording section 2 or the catalyzing section 4. The optically transparent materials can be glass and resin, and resin materials can be acrylate resin, PDMS, polyolefine, polycarbonate, polystyrene, PET, and polyvinyl chloride, however are not limited to these in the same way as First Embodiment, the stress-stimulated luminescent material included in the light emitting section 1 is not particularly limited, and only has to emit light in response to a mechanical energy. In consideration of manageability of quantitative determination, it is preferable to use a stress-stimulated luminescent body that emits light in proportion to a strain energy.

In the same way as First Embodiment, a material constituting the photoreacting section in the recording section 2 is photosensitive to generate photoreaction in response to a wavelength of the light emitted from the light emitting section 1. Substances that are photosensitive due to its photoreactivity can be, for example, a pigment, an inorganic photochromic material, an organic photochromic material, and a photographic photosensitive film, however, are not limited to these.

In addition, when the catalyzing section 4 is included in the stress history recording medium 10, it is preferable to use, as the substances that are photosensitive to generate the photoreaction, substances that reflect well an effect of the catalyzing section 4, in the same way as Second Embodiment. When the catalyzing section 4 is composed of titanium dioxide, for example, pigments preferably used for the recording section 2 are Ag ion-Ag nanoparticles, a ruthenium pigment (N3 pigment, N719, black-dye, and the like), a cyanine pigment (merocyanine, carbocyanine, anthocyanine, hemicyanine, cyanine, and the like), a natural pigment (chlorophyll, protoporphyrin, carotenoid, and the like), a xanthene pigment (eosine Y, rose bengal, and the like), rhodamine 6G, rhodamine B, perylene, triphenylmethane, phthalocyanine, methylene blue, porphyrin, methyl violet, and thionin.

In the same way as Second Embodiment, it is particularly preferable that a material constituting the catalyzing section 4 reacts effectively to light emitted from the stress-stimulated luminescent material. It is more preferable that the material constituting the catalyzing section 4 is stable and does not change colors when not being irradiated with light. Also, when using the stress history recording medium 10 in accordance with the present embodiment, it is possible to obtain reproducible data by preparing preliminarily a standard value. When titanium dioxide is used for the catalyzing section 4, in the same way as Second Embodiment, it is not required to take account of the aforementioned effect of titanium dioxide at time of the detection in case where detection of a stress history record is carried out in an environment of light having a wavelength of 700 nm.

[4] Fourth Embodiment

Figure 4A:
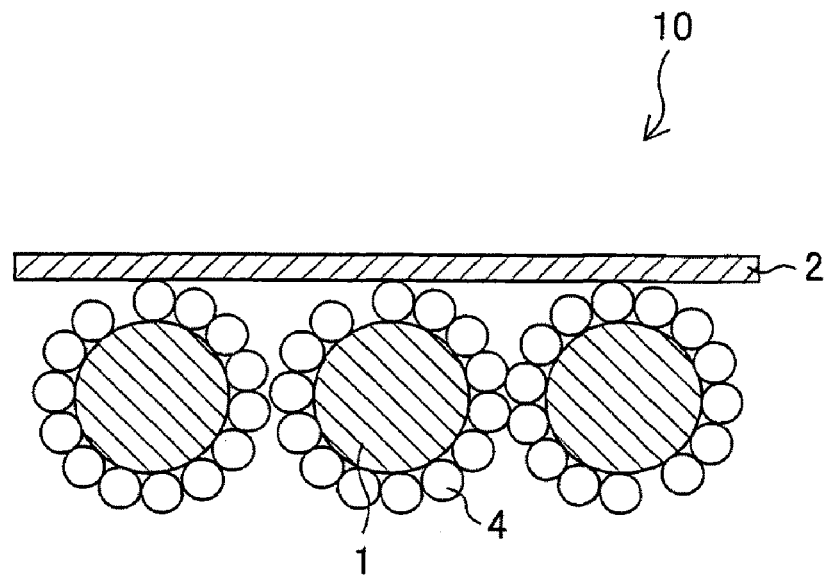
FIG. 4(a) shows an embodiment of the present invention, and is a cross-sectional view showing a structure of a main part of a stress history recording system.
Figure 4B:
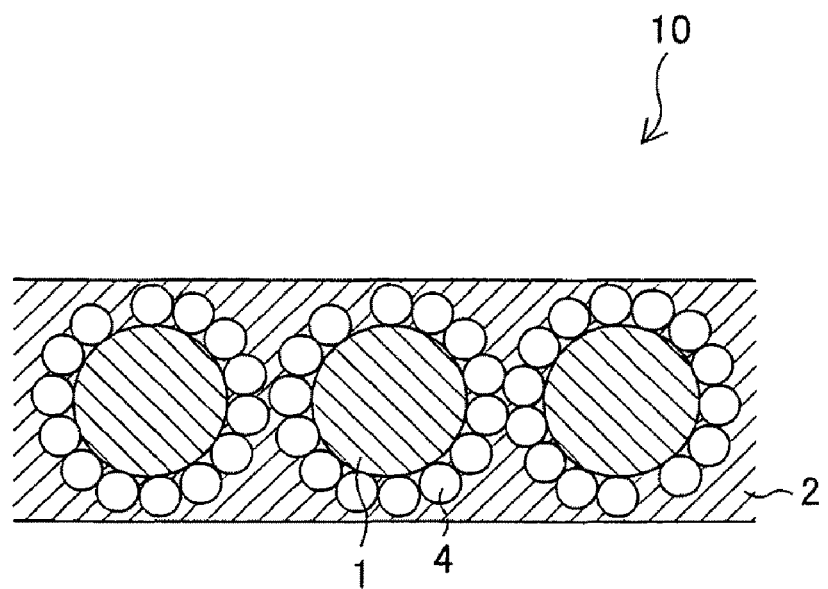
FIG. 4(b) shows an embodiment of the present invention, and is a cross-sectional view showing a structure of a main part of a stress history recording system.

A further embodiment is described below with reference to FIGS. 4(a) and 4(b). A stress history recording medium 10 in accordance with the present embodiment has a light emitting section 1 including a stress-stimulated luminescent material that emits light in response to a mechanical external force, and a recording section 2 for recording a history of a photoreaction generated due to light emission from the light emitting section 1. The recording section 2 has a photoreacting section that generates the photoreaction due to the light emission from the light emitting section 1. The stress history recording medium 10 in accordance with the present embodiment further includes a catalyzing section 4 for enhancing the photoreaction, which is immobilized on the surface of the light emitting section 1. The recording section 2 is provided so as to cover a number of light emitting sections 1 immobilizing the catalyzing sections 4. The recording section 2 may cover wholly a surface of a structure composed of multiple light emitting sections (including catalyzing sections) as shown in FIG. 4(a), or may cover surfaces of individual light emitting section (including catalyzing sections) as shown in FIG. 4(b).

In the same way as First Embodiment, the stress-stimulated luminescent material included in the light emitting section 1 is not particularly limited, and only has to emit light in response to a mechanical energy. In consideration of manageability of quantitative determination, it is preferable to use a stress-stimulated luminescent body that emits light in proportion to a strain energy.

The catalyzing section 4 is not particularly limited, provided that it is composed of a substance capable of enhancing the photoreaction generated in the photoreacting section based on a photo energy generated in the light emitting section 1, and that it is composed of a substance known as "photocatalyst". Substances constituting the catalyzing section 4 may be an oxide semiconductor (titanium dioxide, zinc oxide, tungsten oxide, ferric oxide, and tin oxide, for example), cadmium oxide, and the like. It is particular preferable to use titanium dioxide, an oxidative product composed of a complex of titanium dioxide and other transition metal oxide, and a photocatalyst composed of titanium dioxide-related substance in which a transition metal ion is doped.

A material constituting the photoreacting section in the recording section 2 is photosensitive to generate photoreaction in response to a wavelength of the light emitted from the light emitting section 1. Substances that are photosensitive due to its photoreactivity can be, in the same way as First Embodiment, a pigment, an inorganic photochromic material, an organic photochromic material, and a photographic photosensitive film, for example. However, it is preferable to use, as the substances that are photosensitive to generate the photoreaction, substances that reflect well an effect of the catalyzing section 4. Specifically, when the catalyzing section 4 is composed of titanium dioxide, pigments preferably used for the recording section 2 are Ag ion-Ag nanoparticles, a ruthenium pigment (N3 pigment, N719, black-dye, and the like), a cyanine pigment (merocyanine, carbocyanine, anthocyanine, hemicyanine, cyanine, and the like), a natural pigment (chlorophyll, protoporphyrin, carotenoid, and the like), a xanthene pigment (eosine Y, rose bengal, and the like), rhodamine 6G, rhodamine B, perylene, triphenylmethane, phthalocyanine, methylene blue, porphyrin, methyl violet, and thionin.

In the stress history recording medium 10 in accordance with the present embodiment, the catalyzing section 4 composed of a so-called photocatalyst for promoting the photoreaction in the photoreacting section is adopted. By means of this, it is possible to obtain a stress history record quickly in the same way as the stress history recording medium 10 in accordance with Second Embodiment.

In the same way as Second Embodiment, it is particularly preferable that a material constituting the catalyzing section 4 reacts effectively to light emitted from the stress-stimulated luminescent material. It is more preferable that the material constituting the catalyzing section 4 is stable and does not change colors when not being irradiated with light. Also, when using the stress history recording medium 10 in accordance with the present embodiment, it is possible to obtain reproducible data by preparing preliminarily a standard value. When titanium dioxide is used for the catalyzing section 4, in the same way as Second Embodiment, it is not required to take account of the aforementioned effect of titanium dioxide at time of the detection in case where detection of a stress history record is carried out in an environment of light having a wavelength of 700 nm.

By modifying the surface of the light emitting section 1 (stress-stimulated luminescent body) with pyrophoric acid, the catalyzing section 4 (titanium dioxide, for example) can be immobilized easily on the surface of the light emitting section 1. As a result, it becomes possible to produce hybrid particles having both of a stress light emitting function and a photocatalytic function. By means of such hybrid particles, it is possible to record a stress history with high sensitivity.

[Stress-Stimulated Luminescent Body of the Present Invention]

As described above, a stress-stimulated luminescent body used in a stress history recording system and a stress history recording medium in accordance with the present invention is not particularly limited, and only has to emit light in response to a mechanical energy. In consideration of manageability of quantitative determination, it is preferable to use a stress-stimulated luminescent body that emits light in proportion to a strain energy.

The inventors of the present invention have found a base material structure of the stress-stimulated luminescent body, which is required for exhibiting a stress-stimulated light emission of high intensity. The base material structure of the stress-stimulated luminescent body, having a minimum unit of crystal structure being at least an $AlO_4$-like tetrahedral structure or a $SiO_4$-like tetrahedral structure, has a three-dimensional structure in which apexes of the tetrahedrons are shared by one another so as to provide a large void and a flexible bond. The framework structure is a feldspar structure. The inventors of the present invention have also found that a stress-stimulated luminescent body having such a base material structure into which a certain metal ion is inserted as an emission center emits particularly intense light.

In the present invention, a stress-stimulated luminescent body that is preferably used in view of a stress-stimulated light emission of high intensity has such a basic structure in which a plurality of molecules each having at least an $AlO_4$-like tetrahedral structure or $SiO_4$-like tetrahedral structure share atoms existing at apexes of the tetrahedral structures so as to be coupled to one another so that a base material structure is formed and at least either an alkali metal ion or an alkali earth metal ion is inserted to a void of the base material structure, wherein the base material structure has an asymmetrical framework structure, and at least either the alkali metal ion or the alkali earth metal ion inserted to the void is partially substituted by at least one type of metal ions of rare-earth metal ions or transition ions.

In the stress-stimulated luminescent body, the basic structure is preferably a feldspar structure. For example, the . . . basic structure preferably has a composition of aluminosilicate and has a feldspar-like structure, more preferably an anorthite-like structure. Moreover, the basic structure preferably has a triclinic structure that belongs to a P-1 space group.

It is preferable that the alkali metal ion and the alkali earth metal ion that are inserted to the void of the base material structure is partially substituted by a rare-earth metal ion or a transition metal ion that differ in ion radius from the alkali metal ion and the alkali earth metal ion.

It is preferable that, in the stress-stimulated luminescent body, at least Eu (Eu ion) is inserted to the void. It should be noted that an ion other than Eu ion may be inserted to the void as an emission center. Also, a mixture of Eu ion and other ion that is used for the emission center may be inserted to the void.

It is preferable that the stress-stimulated luminescent body is represented as $Ca_{1-y}Q_yAl_2Si_2O_8$ (It should be noted that Q is at least one type of an emission center, and $0.001 \leq y \leq 0.1$).

A method for producing such a stress-stimulated luminescent body is a step of forming a basic structure containing a base material structure having an asymmetric-framework structure, including a step of: forming a basic structure in which a plurality of molecules each having at least an $AlO_4$-like tetrahedral structure or $SiO_4$-like tetrahedral structure share atoms existing at apexes of the tetrahedron structures so that the base material structure is formed and at least either an alkali metal ion or an alkali earth metal ion is inserted to a void of the base material structure; and partially substituting at least either the alkali metal ion or the alkali earth metal ion inserted to the void by at least one type of metal ions of rare-earth metal ions or transition ions.

When used in the present description, the word "polyhedral structure" means that a molecule, which is composed of a plurality of atoms, is such that a structure composed of hypothetical lines between the atoms forms a polyhedron. That is, the polyhedron is hypothetical, and $SiO_4$ is, for example, a "molecule having a polyhedron structure" in which a tetrahedral structure is formed with hypothetical lines between Si and four oxygen atoms bound to Si.

The plurality of molecules each having a polyhedral structure share atoms existing at apexes of the polyhedral structures so as to be coupled to one another so that a "base material structure" is formed. The molecules for forming the base material structure may be the same or different to each other, provided that they have at least tetrahedral structures.

That is to say, the "base material structure" is formed with a single or multiple type of molecules, each having at least a tetrahedral structure as a minimum unit of crystal, that share atoms existing at the apexes of the tetrahedral structures so as to be coupled one another. By being formed in such a manner, the base material structure has a three-dimensional mesh structure that forms a large void (gap). It is preferable to use a tetrahedral molecule or an octahedral molecule, which have at least a tetrahedral structure, for constituting the base material structure (three-dimensional structure) of the stress-stimulated luminescent body.

Various kinds of cations (alkali metal ion and alkali earth metal ion, for example) are inserted to the void (gap) in the base material structure so that a frame structure of the stress-stimulated luminescent body is formed. The frame structure is a basic structure (a basic skeleton) of the stress-stimulated luminescent body used in the present invention.

A stress-stimulated luminescent body preferably used in the present invention has such a structure that an emission center is inserted to a basic structure having a three-dimensional structure (a three-dimensional frame structure) formed by a plurality of molecules each having at least a $AlO_4$-like tetrahedral structure or $SiO_4$-like tetrahedral structure, and a frame structure that is asymmetric and flexible.

The basic structure has a structure in which a plurality of molecules each having at least a tetrahedral structure share atoms existing at apexes of the tetrahedral structures so as to be coupled to one another so that a base material structure is formed and at least either an alkali metal ion or an alkali earth metal ion is inserted to a void of the base material structure. It is preferable that the base material structure has an asymmetric framework structure.

When used in the present description, the word "asymmetric framework structure" represents, in addition to a frame structure, a structure exhibiting spontaneous strain or elastic anisotropy. A base material structure having such a property tends to become strained, and to change an electronic structure in the emission center existing in the center of the frame by using the strain energy efficiently. As a result, such a structure may provide a stress-stimulated light emission of particular high intensity.

When used in the present description, the word "spontaneous strain" represents an indication showing how much a structure is strained compared to a symmetric structure, and strain that the luminescent body has. It should be noted that the word "spontaneous strain" does not include strain caused by an external force.

The inventors of the present invention have found that a stress-stimulated luminescent body having both a flexible three-dimensional frame structure and a framework structure that is flexible and asymmetric can emit particularly intense light, and that a stress-stimulated luminescent body without either one of the structures does not exhibit light emission. Therefore, the stress-stimulated luminescent body used in the present invention preferably has both of the structures.

It is preferable that the cation to be inserted to the void (gap) of the base material structure is an alkali metal or an alkali earth metal. At least either the alkali metal ion or the alkali earth metal ion may be inserted to the void, and the type of the ion may be one type or more than one. Moreover, at least each one of the alkali metal ion and the alkali earth metal ion may be inserted. That is to say, the ion inserted to the void may be at least one of metal ions selected from groups of the alkali earth metal ion such as Ca, Mg, Ba, and Sr and the alkali metal ion such as Li, Na, K, Rb, and Cs.

In order to make the base material structure become strained more easily, the alkali metal or the alkali earth metal inserted to the void of the base material structure may be partially substituted by other ion (rare-earth metal ion or transition metal ion; for example). The ion for substituting is not limited, provided that a crystal structure of the base material structure (a three-dimensional frame structure that is asymmetric and flexible) is maintained.

Since the ion inserted to the void in the base material structure is partially substituted by at least one of metal ions of the rare-earth metal ion and the transition metal ion, the rare-earth metal ion or the transition metal ion becomes an emission center (a emission center ion) of a stress-stimulated luminescent body. As a result, the stress-stimulated luminescent body may attain a light emitting function.

The rare-earth metal ion and the transition metal ion only have to be capable of being an emission center, and are not particularly limited. For example, the rare-earth metal ions are europium (Eu), dysprosium (Dy), lanthanum (La), gadolinium (Gd), cerium (Ce), samarium (Sm), yttrium (Y), neodymium (Nd), terbium (Tb), praseodymium (Pr), erbium (Er), thulium (Tm), ytterbium (Yb), scandium (Sc), promethium (Pm), holmium (Ho), and lutetium (Lu). The transition metal ions are chromium (Cr), manganese (Mn), ferrum (Fe), antimony (Sb), titanium (Ti), zirconium (Zr), vanadium (V), cobalt (Co), nickel (Ni), copper (Cu), zinc (Zn), niobium (Nb), molybdenum (Mo), tantalum (Ta), and tungsten (W). At least one of the ions above may be selected as the rare-earth metal ion and the transition metal ion.

Further, the inventors of the present invention have found that an amount of the rare-earth metal ion and the transition metal ion existing in the stress-stimulated luminescent body (an amount of emission center) has a great influence on light emission. An amount of the rare-earth metal ion and the transition metal ion is not particularly limited, provided that the three-dimensional structure of the base material structure is maintained, and is preferably not less than 0.1 mol % and not more than 20 mol %, more preferably not less than 0.2 mol % and not more than 10 mol %, further preferably not less than 0.5 mol % and not more than 5 mol %. The stress-stimulated luminescent body can emit light effectively when an amount of the contained emission center is within the range above. It should be noted that when an amount of the contained emission center is less than 0.1 mol %, the stress-stimulated luminescent body cannot emit light efficiently. Meanwhile, when an amount of the contained emission center is more than 20 mol %, the base material structure cannot be maintained, thereby decreasing in light emission efficiency.

The base material structure of the stress-stimulated luminescent body can be generally found in a structure of minerals called a feldspar group, for example. A crystal structure of a feldspar is characterized in that $SiO_4$ tetrahedrons or $AlO_4$ tetrahedrons are coupled to one another so as to form a three-dimensional frame structure and a cation is inserted to a void of the structure. The three-dimensional frame structure is changed in configuration by degrees according to a distribution of Si and Al and a size of the cation. Therefore, a unique noun is not given to the three-dimensional frame structure whose configuration is changed, and the three-dimensional structures are diversely categorized depending on a composition ratio and a type of the cation so as to have own mineral name.

When a plagioclase series is represented as (Na, Ca) (Si, Al) $AlSi_2O_8$, for example, it is categorized into series ranging from $NaAlSi_3O_8$ (Ab) to $CaAl_2Si_2O_8$. Each of the plagioclase series has mineral names as follows depending on a composition range.

Ab100An0-Ab90An10: albite, high-temperature albite, low-temperature albite
Ab90An10-Ab70An30: oligoclase
Ab70An30-Ab50An50: andesine
Ab50An50-Ab30An70: labradorite
Ab30An70-Ab10An90: bytownite
Ab10An90-Ab0An100: anorthite In particular, the basic structure of the stress-stimulated luminescent body can be, for example, a feldspar structure having a composition of aluminosilicate. An anorthite-like structure is particularly preferable.

In regard to the stress-stimulated luminescent body, aluminosilicate refers to aluminosilicate alkali metal salt or aluminosilicate alkali earth metal salt. The aluminosilicate is obtained by partially substituting polysilicate ions by aluminium. In the aluminosilicate, at least either alkali metal ions or alkali earth metal ions are inserted into a void (gap) of its crystal structure. Further, the aluminosilicate has a three-dimensional mesh structure. Thus, the aluminosilicate can be used as the basic structure of the stress-stimulated luminescent body. Note that, a state in which the basic structure is the aluminosilicate can be expressed as follows: The base material structure is $AlSi_3O_8^-$ (in case of alkali metal salt) or $Al_2Si_2O_8^{2-}$ (in case of alkali earth metal salt).

Further, the feldspar-like structure refers to such a structure that, as shown in FIG. 1 for example, basic units of the basic structure are $AlO_4$ tetrahedrons and $SiO_4$ tetrahedrons, and these tetrahedrons share apexes thereof so as to have a large void, and the tetrahedrons are flexibly coupled to one another, and the structure can be freely strained depending on sizes of alkali metal ions or alkali earth metal ions inserted into the void. FIG. 1 shows a crystal structure (basic structure) of $CaSi_2Al_2O_8$. $CaSi_2Al_2O_8$ of FIG. 1 has a triclinic structure belonging to a P-1 space group and has an anorthite-like structure.

More specifically, the feldspar structure refers to a feldspathic structure. The feldspar structure is aluminosilicate whose ideal chemical composition is Z (Si, Al)$_4$O$_8$ where Z represents alkali metal or alkali earth metal, and $0<Al/Si \leq 1$. In the aluminosilicate, each of $SiO_4$ and $AlO_4$ represented by (Si,Al)$O_4$ has a tetrahedral structure which has Si or Al in its center and has oxygen atoms (O) in its apexes so as to serve as a minimum unit. Further, a plurality of the tetrahedrons share all apexes and are coupled to one another so as to form a three-dimensional structure. Further, the feldspar structure is such that Z (at least either alkali metal or alkali earth metal) is inserted into a void (gap) of the three-dimensional structure. The feldspar is generally a solid solution containing, as end members, albite $NaAlSi_3O_8$, anorthite $CaAl_2SiO_8$, and potassium feldspar $KalSi_3O_8$. That is, the feldspar structure is a mixture of a plurality of aluminosilicates each having an anorthite-like structure.

Note that, the "anorthite-like structure" refers not only to anorthite ($CaAl_2Si_2O_8$) but also to a structure similar to the anorthite structure (i.e., a similar composition) as long as at least either the alkali metal or the alkali earth metal can be inserted into the void of the base material structure constituting the three-dimensional structure of the luminescent material. Likewise, the "feldspar-like structure" refers not only to feldspar but also to a structure similar to the feldspar structure (i.e., a similar composition) as long as at least either the alkali metal or the alkali earth metal can be inserted into the void of the base material structure constituting the three-dimensional structure of the luminescent body. The alkali metal ions of the aforementioned structure can be substituted by another monovalent metal ions, or the alkali earth metal ions can be substituted by other bivalent metal ions.

Further, it is preferable that the basic structure has a triclinic structure belonging to a P-1 space group. The triclinic structure belonging to a P-1 space group does not have symmetry in its crystal, so that the triclinic is favorable as a basic structure of the stress-stimulated luminescent body.

Further, the basic structure may be a feldspathoid having a feldspar structure. As in the feldspar, also the feldspathoid is aluminosilicate, and all apexes of $AlO_4$ and $SiO_4$ are shared so that $AlO_4$ and $SiO_4$ are coupled to one another so as to form a three-dimensional structure. Examples of the feldspathoid include: leucite $KalSi_2O_6$; nepheline $NaAlSiO_4$; a composition whose crystal structure is similar to crystal structures of these compositions; and the like.

It is more preferable that the basic structure is aluminosilicate represented by any one of the following expressions (1) to (4).

$$M_xN_{1-x}Al_2Si_2O_8 \tag{1}$$

$$X_xY_{1-x}AlSi_3O_8 \tag{2}$$

$$(X_xM_{1-x})(Si_xAl_{1-x})AlSi_2O_8 \tag{3}$$, or $$X_xM_yCa_{1-x-y}Al_{2-x}Si_{2+x}O_8 \tag{4}$$

It should be noted that each of M and N represents bivalent metal ions, and at least one kind thereof is Ca, Sr, Ba, Mg, or Mn, and each of X and Y represents monovalent metal ions, and at least one kind thereof is Li, Na, or K, and $0 \leq x \leq 0.8$ and $0 \leq y \leq 0.8$.

In the foregoing expressions (1) to (4), the alkali metal or the alkali earth metal is not necessarily of two kinds as long as each metal is of at least one kind. That is, in the expression (3) for example, it may be so arranged that two or more kinds of alkali metal (X) and two or more kinds of alkali earth metal (M) are included.

Further, in case where the stress-stimulated luminescent body includes plural kinds of alkali metal or alkali earth metal as in the expressions (1) to (4) for example, it is preferable that the plural kinds of alkali metal and/or alkali earth metal are different from one another in terms of an ion radius. As a result, the stress-stimulated luminescent body is more greatly strained than the case of a single kind of alkali metal or a single kind of alkali earth metal. Thus, the stress-stimulated luminescent body is more easily emit light. In other words, if the stress-stimulated luminescent body includes plural kinds of alkali metal and/or alkali earth metal which are different from one another in terms of an ion radius, also spontaneous strain of the stress-stimulated luminescent body changes. The stress-stimulated luminescent body which is spontaneously strained more easily emits light than a stress-stimulated luminescent body showing no spontaneous strain. Thus, the stress-stimulated luminescent body having plural kinds of alkali metal and/or alkali earth metal which are different from one another in terms of an ion radius more easily emits light. In this way, if the spontaneous strain of the stress-stimulated luminescent body is adjusted, it is possible to allow the stress-stimulated luminescent body to easily emit light.

The stress-stimulated luminescent body emits preferably blue light, particular preferably light having a wavelength of approximately 400 nm. The blue light, in particular light having a wavelength of approximately 400 nm, is less emitted from a light apparatus such as a fluorescent light. This results in such an advantage that there is little interference of the lighting circumstance in measuring the emitted light. Further, the blue light emission has a high energy, and therefore can be detected easily by a detector. Thus, emission intensity of the stress-stimulated luminescent body can be easily detected.

The inventors of the present invention have found that, if an Eu ion is selected as the rare earth metal ion, the stress-stimulated luminescent body emits blue light. Conventionally, a stress-stimulated luminescent body that emits intense light whose wavelength is 500 nm or more (from green to red light) has been known, but a luminescent body that emits intense light of shorter wavelength, which is blue to bluish-purple light, has not been known.

That is, a stress-stimulated luminescent body that is preferably used in the present invention includes at least an Eu ion as an emission center. Such a stress-stimulated luminescent body has a crystal structure unique to the present invention so that it is possible to provide a stress-stimulated luminescent body or the like that particularly emits intense blue or bluish-purple light.

More specifically, it is preferable that the stress-stimulated luminescent body which emits particularly intense blue light is represented by the following expressions (5) and (6), $$M_{1-x-y}N_xQ_yAl_2Si_2O_8 \tag{5}$$

$$X_{1-x-y}Y_xQ_yAl_{2-x}Si_{2+x}O_8 \tag{6}$$

where each of M and N represents bivalent metal ions, and at least one kind thereof is Ca, Sr, Ba, Mg, or Mn, and each of X and Y represents monovalent metal ions, and at least one kind thereof is Li, Na, or K, and Q represents rare earth metal ions or transition metal ions, and $0 \leq x \leq 0.8$ and $0.001 \leq y \leq 0.1$.

Note that, in case of the alkali earth metal as represented by the expression (5), each of Al and Si remains 2, so that there is no change in x of the expression. While, in case of the alkali metal as represented by the expression (6), x indicative of the number of kinds of monovalent alkali metal increases. In response, tetravalent Si accordingly increases to be (2+x) and trivalent Al accordingly decreases to be (2−x), so that electric charges are balanced.

Further, it is preferable to arrange the stress-stimulated luminescent body so that at least Ca is selected as the alkali earth metal and the Ca site is partially substituted by at least one kind of the emission center. That is, the luminescent body is represented by the following expression (7), $$Ca_{1-y}Q_yAl_2Si_2O_8 \tag{7}$$

where Q represents Eu and at least one kind of other luminescent center, and y satisfies $0.001 \leq y \leq 0.1$.

When the emission center includes only Eu, the expression (7) can be represented by $Ca_{1-m-n}N_nEu_mAl_2Si_2O_8$, where m and n satisfies $0.001 \leq m \leq 0.1$.

When the emission center includes only Eu, m satisfies $0 \leq m \leq 0.1$. When the emission center includes a mixture of Eu and other emission center ion, an amount (m) of the mixture as the emission center only has to be more than 0 and 0.2 or less.

The stress-stimulated luminescent body can emit particularly intense blue light which cannot be achieved by any conventional technique. Note that, it is preferable that the emission center (Q) includes at least Eu in the expression (7). That is, it is preferable that at least Eu is included as the rare earth metal ion of the emission center in the expression (7). For example, the emission center includes only Eu or a mixture of Eu and Dy. In this way, if Eu is included as the emission center, it is possible to realize a stress-stimulated luminescent body which emits particularly intense blue light.

The blue light has a short wavelength so that its energy is high. Thus, when using the stress-stimulated luminescent body that emits the blue light, its energy can be used as excitation light. Therefore, when using a composite material made of the luminescent body that emits the blue light and a luminescent body that emits light other than blue light, energy of the blue luminescent body can be used easily as excitation energy for exciting the luminescent body that emits light other than blue light.

A surface of each of various base materials is coated with a coating film made of the stress-stimulated luminescent body of the present invention, thereby forming a laminate material. In coating the surface, it is possible to adopt: a physical technique such as sputtering and aerosol; and a chemical technique such as evaporative decomposition and spin-coating. In case of forming the coating film by thermal decomposition, a compound which allows for formation of a predetermined base material structure, which is, for example, a coating solution prepared by dissolving nitrate, halide, or alkoxy compound in a solvent, is applied to a surface of a heat-resistance base material, and then the resultant is sintered, thereby forming the film. The heat-resistance base material is not particularly limited, but examples of a material thereof include: heat-resistance glass such as quartz, silicon, graphite, quartz glass, and vycor glass; ceramics such as alumina, silicon nitride, silicon carbide, and molybdenum disilicide; heat-resistance metal or heat-resistance alloy such as heat-resistance steel (e.g. stainless steel), nickel, chromium, titanium, and molybdenum; cermet; cement; concrete; and the like.

The stress-stimulated luminescent body in accordance with the present invention can be used as a composite material made of the stress-stimulated luminescent body and other inorganic material or organic material. The composite material includes the stress-stimulated luminescent body, so that the composite material emits light when a mechanical external force causes the composite material to be strained. For example, the stress-stimulated luminescent material is mixed and dispersed at an arbitrary ratio in a resin or an organic material such as plastic, thereby forming a composite material. If a mechanical external force is applied to the composite material, the stress-stimulated luminescent body included in the composite material is strained. The strain results in excitation energy, so that the composite material emits light.

The stress-stimulated luminescent body in accordance with the present invention can be applied to a surface of other material. In other words, the stress-stimulated luminescent body can be used under such condition that a layer including the stress-stimulated luminescent material (a stress-stimulated light emitting layer) is formed on a surface of other material. As a result, when a mechanical external force is applied to the material including the stress-stimulated light emitting layer, the stress-stimulated light emitting layer is deformed, and therefore emits light. In this way, if the stress-stimulated luminescent body is used under such condition that the stress-stimulated light emitting layer is formed, it is possible to realize large-area light emission with a small amount of the stress-stimulated luminescent body.

Each of the embodiments above explains an example of the stress history recording system that is realized in hardware (stress history recording medium). However, it is easily understood by persons skilled in the art that the same process as the example can be carried out by "functional block attained by a computing means such as CPU that runs a program code stored in a recording medium such as ROM and RAM". The stress history recording system in accordance with the present invention can be attained also by combining hardware for performing a part of process and the computing means for running a program code that carries out a control of the hardware and rest of the process. Further, in the stress history recording system in accordance with the present invention, even a component described as the hardware, which is included in aforementioned components, can be replaced with a combination of hardware for performing a part of process and the computing means for running a program code that carries out a control of the hardware and rest of the process. It should be noted that a computing means for running the program code may be singularly used, or a plurality of computing means connected to each other via bus or various channels inside the device may run the program code in combination.

The program code that can be run directly by the computing means or a program that is referred to as data capable of producing a program code by after-mentioned decompression or the like is stored in a storage medium; and the storage medium is distributed, or the program (the program code or the data) is distributed by a communicating means for transmitting via wired or wireless communication channels. Then, the computing means run the program.

Note that, when transmitting the program via the communication channel, each transmitting medium that constitutes the communication channel propagates a signal string indicative of the program. As a result, the program is transmitted via the communication channel. Moreover, when transmitting the signal string, a transmitting device may modulate carrier wave by the signal string indicative of the program so as to make the signal string overlap the carrier wave. In this case, a receiving device demodulates the carrier wave so that the signal string is restored. On the other hand, when transmitting the signal string, the signal string may be divided into packets as a digital data string by the transmitting device. In this case, the receiving device restores the signal string by coupling the received packets. Further, when transmitting the signal string, the transmitting device may multiplex the signal string with other signal string by time-dividing/frequency-dividing/code-dividing and the like. In this case, the receiving device restores the signal string by extracting each signal string from the multiplexed signal strings. The same effect can be attained in any case mentioned above as long as the program can be transmitted via the communication channels.

Here, the storage medium for the distribution of a program is preferable removable. After the distribution of the program, the storage medium may or may not be removable. In addition, the storage medium may or may not be rewriteable (writeable) or volatile, be recordable by any method, and come in any shape at all, provided that the medium can hold the program. Examples of such a storage medium include tapes, such as magnetic tapes and cassette tapes; magnetic disks, such as floppy (registered trademark) disks and hard disks; and other discs, such as CD-ROMs, magneto-optical discs (MOs), mini discs (MDs), and digital video discs (DVDs). In addition, the storage medium may be a card, such as an IC card or an optical card; a semiconductor memory, such as a mask ROM, an EPROM, an EEPROM, or a flash ROM; or a memory provided inside a CPU or other computing means.

The program code may be such that it instructs the computing means regarding all the procedures of the processes. If there is already a basic computer program (for example, an operating system or library) which can be retrieved by a predetermined procedure to execute all or some of the processes, code or a pointer which instructs the computing means to retrieve that basic computer program can replace all or some of the processes.

In addition, the program storage format of the storage medium may be, for example, such that: the computing means can access the program for an execution as in an actual memory having loaded the program; the program is not loaded into an actual memory, but installed in a local storage medium (for example, an actual memory or hard disk) always accessible to the computing means; or the program is stored before installing in a local storage medium from a network or a mobile storage medium. In addition, the program is not limited to compiled object code. The program may be stored as source code or intermediate code generated in the course of interpretation or compilation. In any case, similar effects are obtained regardless of the format in which the storage medium stores the program, provided that decompression of compressed information, decoding of encoded information, interpretation, compilation, links, or loading to a memory or combinations of these processes can convert into a format executable by the computing means.

The present invention is not limited to the embodiments described above, and variations can be effected within the scope of the following claims. Combinations of technical features changed accordingly within the scope of the claims are also included in the scope of the present invention.

In addition, all of the academic documents and the patent documents described in the present description are incorporated by reference herein.

The present invention is more specifically described in Example below, however, the present invention is not limited by this Example.

EXAMPLE

Figure 5:
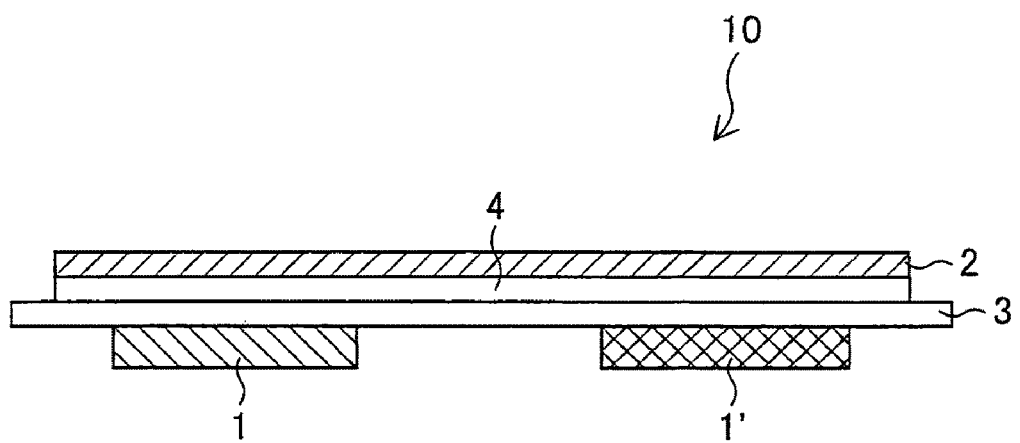
FIG. 5 shows an embodiment of the present invention, and is a cross-sectional view showing a structure of a main part of a stress history recording system.

One surface of a glass plate 3 (Matsunami Glass Ind., Ltd.) was coated with titanium dioxide sol (ISHIHARA SANGYO KAISHA, LTD., visible light-utilizing $TiO_2$ photocatalyst MPT-623), and then further coated with methylene blue 2, which is a commercially available pigment. A backside of a transparent sheet was coated with SAO ($SrAl_2O_4$:Eu) that is a green light-emitting stress-stimulated luminescent body 1 having a peak wavelength of 510 nm and CAS ($CaAl_2SiO_8$:Eu) that is a blue light-emitting stress-stimulated luminescent body 1' having a peak wavelength of 400 nm by screen printing so that the SAO and the CAS were formed in a band-like shape (FIG. 5). After applying frictional force (force for generating 1N load at a velocity of 2 cm/s) for one hour to a sample of a recording medium produced in the aforementioned manner, a site in which the sample was coated with methylene blue was observed (FIG. 6(a)). Further, the sample to which the frictional force was applied was irradiated with white light from a halogen lamp via six irradiating fibers. A reflected spectrum from the sample was inputted to a multi-channel spectrometer via a reading fiber, and then was analyzed (FIG. 6(b)). The curves [A] through [C] in FIG. 6(b) show analysis results of reflected spectrums of sites [A] through [C] in FIG. 6(a), respectively.

Figure 6A:
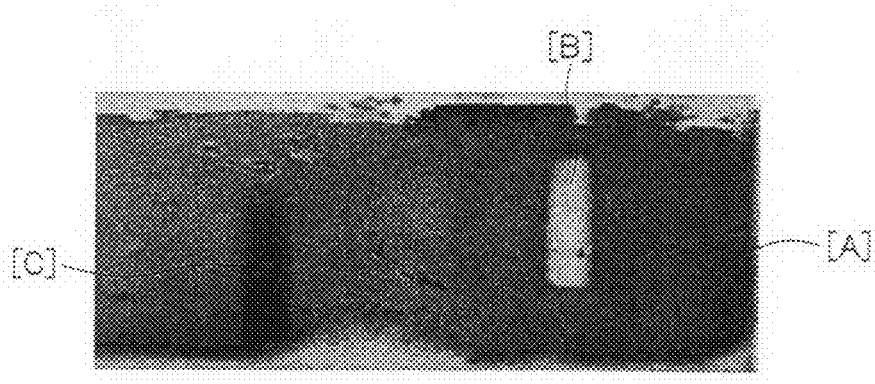
FIG. 6(a) is a view showing a stress recording state of a stress history recording system in accordance with the present invention.
Figure 6B:
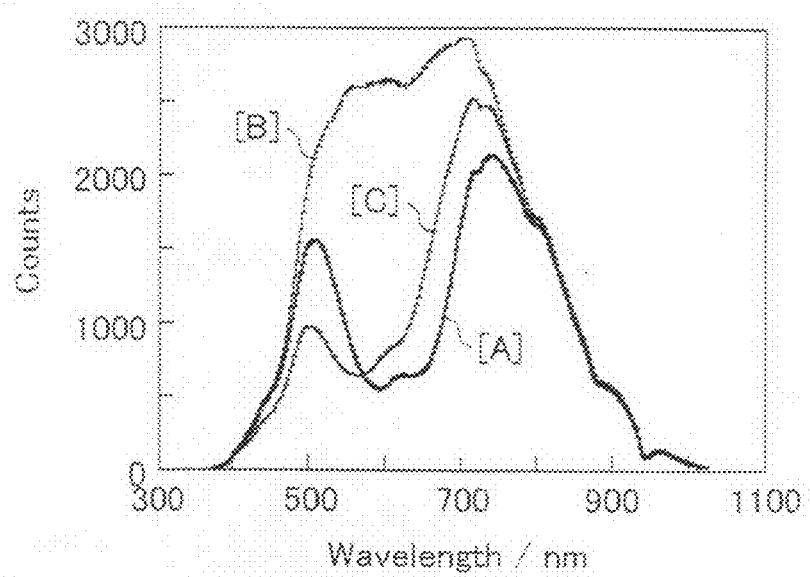
FIG. 6(b) is a view showing a stress recording state of a stress history recording system in accordance with the present invention.
Figure 6C:
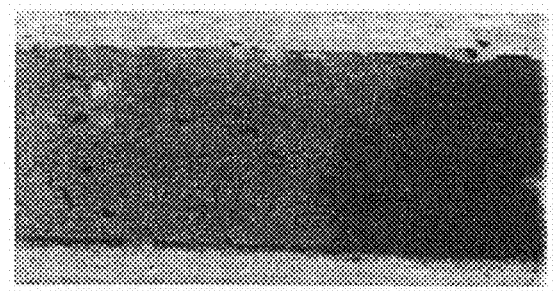
FIG. 6(c) is a view showing a stress recording state of an example in comparison to a stress history recording system in accordance with the present invention.
Figure 6D:
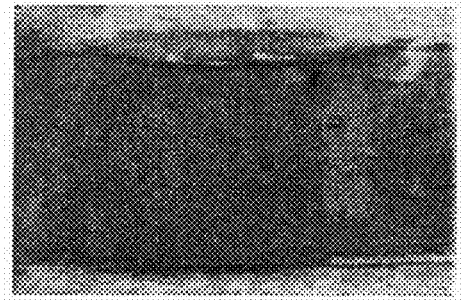
FIG. 6(d) is a view showing a stress recording state of an example in comparison to a stress history recording system in accordance with the present invention.

As shown in FIG. 6(a), a site that was coated with the stress-stimulated luminescent body SAO having a peak wavelength of 510 nm changed its color (the site [C] in FIG. 6(a)), and a site that was coated with the stress-stimulated luminescent body CAS having a peak wavelength of 400 nm lost its color (the site [B] in FIG. 6(a)). This indicates that, by irradiating the stress-stimulated luminescent body with light after applying frictional force, the pigment causes a photoreaction. It is possible to estimate a stress history from changes in color, and to record the stress history in a reproducible manner by preparing preliminarily a standard curve for each luminescent body.

A sample for comparison was prepared in the same way as the example above, except that the titanium dioxide sol was a short wavelength-utilizing $TiO_2$ photocatalyst ST-01 (ISHIHARA SANGYO KAISHA, LTD.). After applying frictional force to the sample in the same way as the example above, a site that was coated with methylene blue was observed (FIG. 6 (c)). In this case, the pigment hardly changed its color because a photoreaction at 500 nm wavelength was not proceeded sufficiently.

Another sample for comparison was prepared in the same way as the example above, except that the stress-stimulated luminescent body is attached to the backside of the transparent sheet by using a siloxane adhesive agent, not by screening printing. After applying frictional force to the sample in the same way as the example above, a site that was coated with methylene blue was observed (FIG. 6(d)). In this case, the pigment hardly changed its color because optical transparency and adhesive state between the pigment and the catalyst were changed by siloxane.

As described above, when an external force is applied to a stress-stimulated luminescent body-titanium dioxide hybrid, a loss of color in a pigment was clearly comfirmed.

Figure 7A:
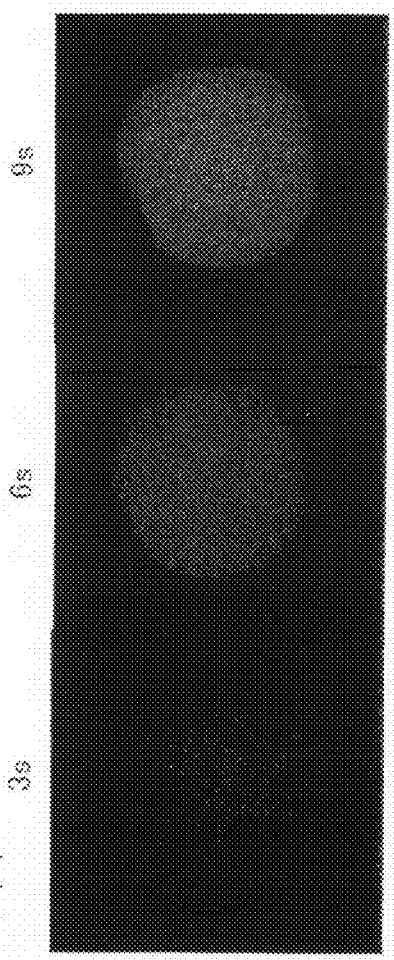
FIG. 7(a) is a view showing an observation result of a recording material on which light emission from a stress-stimulated luminescent body is recorded, in a stress history recording system in accordance with the present invention.
Figure 7B:
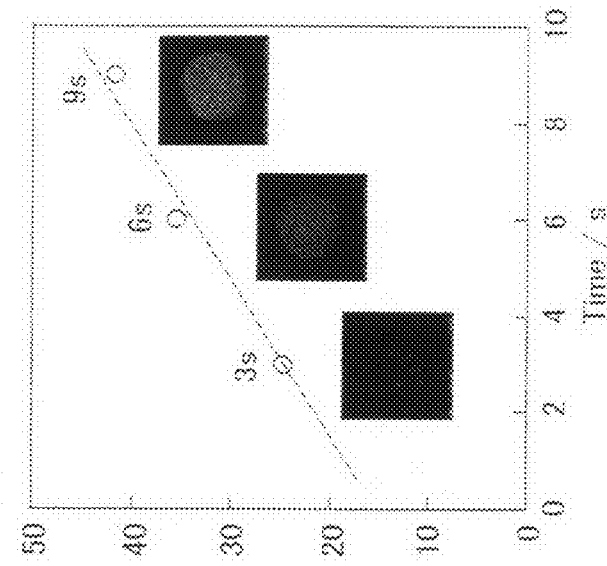
FIG. 7(b) is a graph showing chromatic spectrums of a recording material on which light emission from a stress-stimulated luminescent body is recorded, in a stress history recording system in accordance with the present invention.
Figure 7C:
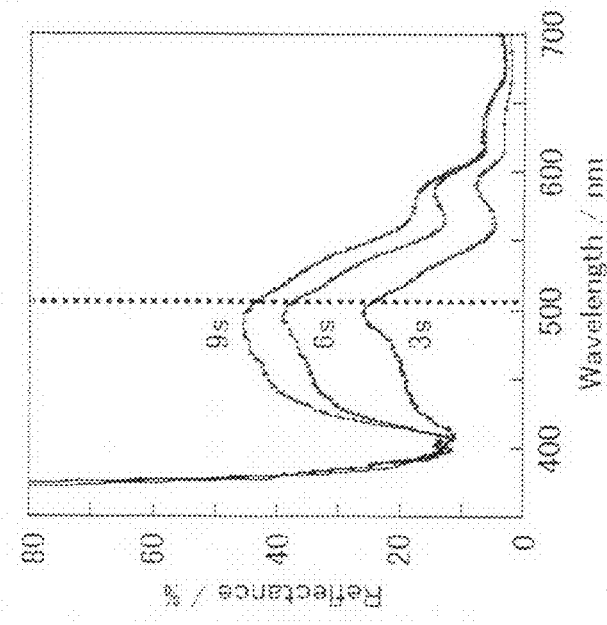
FIG. 7(c) is a graph plotting reflectance ratios (luminescent factors), which is measured at a wavelength of 510 nm, of a recording material on which light emission from a stress-stimulated luminescent body is recorded, in a stress history recording system in accordance with the present invention.

Moreover, light emission from a stress-stimulated luminescent body was recorded by using a silver salt film as a recording material (recording section). A pellet (2 cm in diameter, approximately 1 cm in thickness) made by mixing an epoxy resin and SAO ($SrAl_2O_4$:Eu), which is a green light-emitting stress-stimulated luminescent body having a peak wavelength of 510 nm, and shape-forming thereafter, was arranged so as to face a recording material (polaroid color 669 (8.5×10.8 cm: ISO80) set in a film holder) at intervals of approximately 5 cm in a dark room. The recording material was exposed to light from the stress-stimulated luminescent body by opening a sliding shutter of the film holder for 3, 6, and 9 seconds. Closing the shutter stops the recording material from being exposed to the light. FIG. 7(a) shows a result of observation of the recording material on which the light emission is recorded. FIG. 7(b) is a graph showing chromatic spectrums of the recording material. FIG. 7(c) is a graph plotting reflectance ratios (luminescent factors) which is measured at a wavelength of 510 nm. These results indicate that, when the film is exposed to more photons by making time of exposure longer, a silver salt reaction further proceeds, and the recording material can record intensity of applied stress more specifically. That is to say, the recording material composed of a silver salt film is applicable to the embodiment of the present invention.

According to the present invention, it is possible to obtain a summation of stress generated within a certain period of time as a stress history. As a result, it is possible to record a summation of applied stress, a strain, and a summation of energy. Moreover, by using the present invention, it is possible to record successfully even a small stress history.

Specific embodiments or examples implemented in BEST MODE FOR CARRYING OUT THE INVENTION and EXAMPLE only show technical features of the present invention and are not intended to limit the scope of the invention. Variations can be effected within the spirit of the present invention and the scope of the following claims.

Industrial Applicability

It is extremely important to record a stress history from the viewpoint of safety when in regard to safety management of a large size construction, for example. Therefore, the present invention can be widely used in various industries. Moreover, utilization of a hybrid of the stress history recording system and titanium dioxide or the like, which has been proved of achievement, makes the present invention be used efficiently in fields that draw public attention, such as environmental sanitation and energy.

The invention claimed is:

1. A stress history recording medium for recording a stress history, the stress history recording medium comprising:
    a light emitting section including a stress-stimulated luminescent material that emits light in response to a mechanical external force;
    a recording section for recording a history of a photoreaction generated due to light emission from the light emitting section;
    a catalyzing section for enhancing the photoreaction; and
    an immobilizing section for immobilizing the light emitting section and the recording section,
    the catalyzing section being provided adjacently to the light emitting section, the recording section having a photoreacting section for generating the photoreaction in proportion to intensity of the light emission, and the recording section covering at least the catalyzing section.

2. The stress history recording medium according to claim 1, wherein the photoreaction changes in proportion to the external force.

3. The stress history recording medium according to claim 1, wherein the photoreacting section is irreversible photosensitive.

4. The stress history recording medium according to claim 3, wherein the photoreacting section is made from a pigment, an inorganic photochromic material, an organic photochromic material, or a photographic photosensitive film.

5. A stress history recording medium for recoding a stress history, comprising:
  a light emitting section including a stress-stimulated luminescent material that emits light in response to a mechanical external force;
  a recording section for recording a history of a photoreaction generated due to light emission from the light emitting section;
  a catalyzing section for enhancing the photoreaction; and
  an immobilizing section being made from an optically-transparent material and immobilizing the light emitting section and the recording section,
  the catalyzing section being provided adjacently to the light emitting section,
  the recording section having a photoreacting section for generating the photoreaction in proportion to intensity of the light emission, and
  the recording section being immobilized on that surface of the catalyzing section via the immobilizing section, which faces the recording section.

6. The stress history recording medium according to claim 5, wherein the photoreaction changes in proportion to the external force.

7. The stress history recording medium according to claim 5, wherein the photoreacting section is irreversible photosensitive.

8. The stress history recording medium according to claim 7, wherein the photoreacting section is made from a pigment, an inorganic photochromic material, an organic photochromic material, or a photographic photosensitive film.

9. A stress history recording medium for recoding a stress history, the stress history recording medium comprising:
  a light emitting section including a stress-stimulated luminescent material that emits light in response to a mechanical external force;
  a recording section for recording a history of a photoreaction generated due to light emission from the light emitting section;
  a catalyzing section for enhancing the photoreaction; and
  an immobilizing section being made from an optically-transparent material and immobilizing the light emitting section and the recording section,
  the catalyzing section being immobilized on that surface of the light emitting section via the immobilizing section, which faces the catalyzing section,
  the recording section having a photoreacting section for generating the photoreaction in proportion to intensity of the light emission, and
  the recording section covering the catalyzing section.

10. The stress history recording medium according to claim 9, wherein the photoreaction changes in proportion to the external force.

11. The stress history recording medium according to claim 9, wherein the photoreacting section is irreversible photosensitive.

12. The stress history recording medium according to claim 11, wherein the photoreacting section is made from a pigment, an inorganic photochromic material, an organic photochromic material, or a photographic photosensitive film.

13. A stress history recording medium for recoding a stress history, the stress history recording medium comprising:
  a light emitting section including a stress-stimulated luminescent material that emits light in response to a mechanical external force;
  a recording section for recording a history of a photoreaction generated due to light emission from the light emitting section; and
  a catalyzing section being immobilized on a surface of the light emitting section and enhancing the photoreaction;
  the recording section having a photoreacting section for generating the photoreaction in proportion to intensity of the light emission, and
  the recording section covering a plurality of the light emitting sections immobilizing the catalyzing section.

14. The stress history recording medium according to claim 13, wherein the photoreaction changes in proportion to the external force.

15. The stress history recording medium according to claim 13, wherein the photoreacting section is irreversible photosensitive.

16. The stress history recording medium according to claim 15, wherein the photoreacting section is made from a pigment, an inorganic photochromic material, an organic photochromic material, or a photographic photosensitive film.

17. A stress history recording system for recording a stress history, comprising:
  light emitting means including a stress-stimulated luminescent material that emits light in response to a mechanical external force; and
  recording means for recording a history of a photoreaction generated due to light emission from the light emitting means,
  the recording means having a photoreacting section for generating the photoreaction in proportion to intensity of the light emission, and
  a catalyzing section for enhancing the photoreaction.

* * * * *